US012158041B1

(12) United States Patent
Salzer

(10) Patent No.: US 12,158,041 B1
(45) Date of Patent: Dec. 3, 2024

(54) WINDOW BOARD-UP DEVICE

(71) Applicant: Ray Dean Salzer, Olympia, WA (US)

(72) Inventor: Ray Dean Salzer, Olympia, WA (US)

( * ) Notice: Subject to any disclaimer, the term of this patent is extended or adjusted under 35 U.S.C. 154(b) by 207 days.

(21) Appl. No.: 17/461,721

(22) Filed: Aug. 30, 2021

Related U.S. Application Data

(60) Provisional application No. 63/073,367, filed on Sep. 1, 2020.

(51) Int. Cl.
*E06B 9/06* (2006.01)

(52) U.S. Cl.
CPC .................................. *E06B 9/0607* (2013.01)

(58) Field of Classification Search
CPC ..... E06B 9/02; E06B 9/04; E06B 9/06; E06B 9/0607; E06B 9/0615; E06B 2009/005
USPC .................................................... 52/202, 203
See application file for complete search history.

(56) References Cited

U.S. PATENT DOCUMENTS

| | | | | | |
|---|---|---|---|---|---|
| 3,802,690 | A * | 4/1974 | Tavano | E04F 21/28 | 269/166 |
| 4,384,436 | A * | 5/1983 | Green | E06B 9/01 | 52/509 |
| 4,844,395 | A * | 7/1989 | Perentin | A47F 7/19 | 248/205.8 |
| 5,722,206 | A * | 3/1998 | McDonald | E06B 9/02 | 49/51 |
| 6,155,009 | A * | 12/2000 | Pena | E06B 9/02 | 52/171.3 |
| 6,393,777 | B1 * | 5/2002 | Renfrow | E06B 9/02 | 248/475.1 |
| 6,502,355 | B1 * | 1/2003 | Bori | E06B 9/02 | 248/363 |
| 7,389,615 | B1 * | 6/2008 | Kelley | E06B 9/02 | 248/231.9 |
| 8,490,346 | B2 * | 7/2013 | Wedren | E06B 9/00 | 52/203 |
| 9,587,427 | B2 * | 3/2017 | Webb | E06B 9/02 | |
| 9,663,983 | B2 * | 5/2017 | Wexler | E06B 9/24 | |
| 11,905,730 | B2 * | 2/2024 | Meyer | F41H 5/24 | |
| 2007/0101667 | A1 * | 5/2007 | Sweet, Jr. | E06B 9/02 | 52/202 |
| 2010/0281783 | A1 * | 11/2010 | Harrington | E06B 9/06 | 137/511 |
| 2011/0239559 | A1 * | 10/2011 | Wedren | E06B 9/00 | 52/514 |
| 2012/0285106 | A1 * | 11/2012 | Donoho | A01M 29/08 | 52/203 |
| 2013/0269271 | A1 * | 10/2013 | Webb | E06B 9/02 | 52/698 |
| 2015/0184444 | A1 * | 7/2015 | Wexler | E06B 7/26 | 52/203 |
| 2023/0358067 | A1 * | 11/2023 | Meyer | E04H 9/04 | |

* cited by examiner

*Primary Examiner* — Rodney Mintz
(74) *Attorney, Agent, or Firm* — Plager Schack LLP; Mark H. Plager, Esq.; Naomi Mann, Esq.

(57) ABSTRACT

A window board-up assembly comprises a mounting device including a bracket, a suction cup configured to attach the framing bracket to a smooth surface, such as a glass window of a building, and a suction cup actuator handle for creating suction pressure between the glass window and the suction cup. The mounting device is configured to securely hold a framing member for attachment of a blocking member to board-up the window.

11 Claims, 5 Drawing Sheets

WINDOW BOARD-UP DEVICE

RELATED APPLICATION

This application claims benefit to provisional patent application U.S. Ser. No. 63/073,367 filed on Sep. 1, 2020, the contents of which are incorporated herein by this reference.

BACKGROUND

The embodiments herein relate generally to devices and systems for boarding up a structure.

Building structures such as storefronts, businesses, and homes may sometimes need to be boarded-up, for example, due to weather, vandals, looters, burglars, or a violent event where building safety is a factor. However, boarding-up the building structure may require materials to be screwed or nailed into window frames, exterior surfaces, and/or the flooring or base surface(s), which may damage the structure. As such, an improved system for boarding-up a building structure is desirable.

SUMMARY

According to various embodiments, disclosed is board-up assembly which may comprise a mounting device configured to attach to a glass or other smooth, non-porous surface (e.g. window) of a building structure, via suction pressure. In embodiments, the mounting device may support a blocking member configured to board-up an area, such as the widow, of the building structure. In some embodiments, the mounting device may include a bracket, and a suction cup. In certain embodiments, the mounting device may further comprise a suction cup actuator, which may be a lever or a clamp handle, for creating suction pressure between the attachment surface and suction cup. In some embodiments, the assembly may further comprise a framing member, which may be securely held within the framing bracket, and a blocking member comprising a sheet material, which may be attached to the framing member. In certain embodiments, the framing member may be made of wood, and may be secured to the bracket via fastening elements such as nails or screws. The blocking member may further be secured to the framing member via fastening elements such as nails or screws. As such, the structure may be boarded-up without nailing or screwing material directly into the building structure.

According to various embodiments, also disclosed is a method for boarding-up a building structure, which may comprise attaching a mounting device to a smooth surface of the building structure via suction pressure; and attaching a blocking member to the mounting device, the blocking member being configured to board-up an area of the building structure such as a window. In certain embodiments, attaching the blocking member may comprise securing a framing member within a bracket of the mounting device, and attaching the blocking member to the framing member.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

With reference to the accompanying figures, and in accordance with various embodiments, disclosed is a window board-up assembly 10 comprising a mounting device 12 configured to attach to a window 18 or other smooth surface of a building structure 20 via suction. In embodiments, board-up assembly 10 may also comprise a framing member 14*a*, which may be retained by mounting device 12. Additionally, board-up assembly 10 may comprise a blocking member 16*a* which may be attached to framing member 14*a*. The disclosed assembly may effectively board-up window 18 or other areas of building structure 20 which may be weak and/or vulnerable to break-ins, vandalism, storm damage, and the like.

Figure 1:
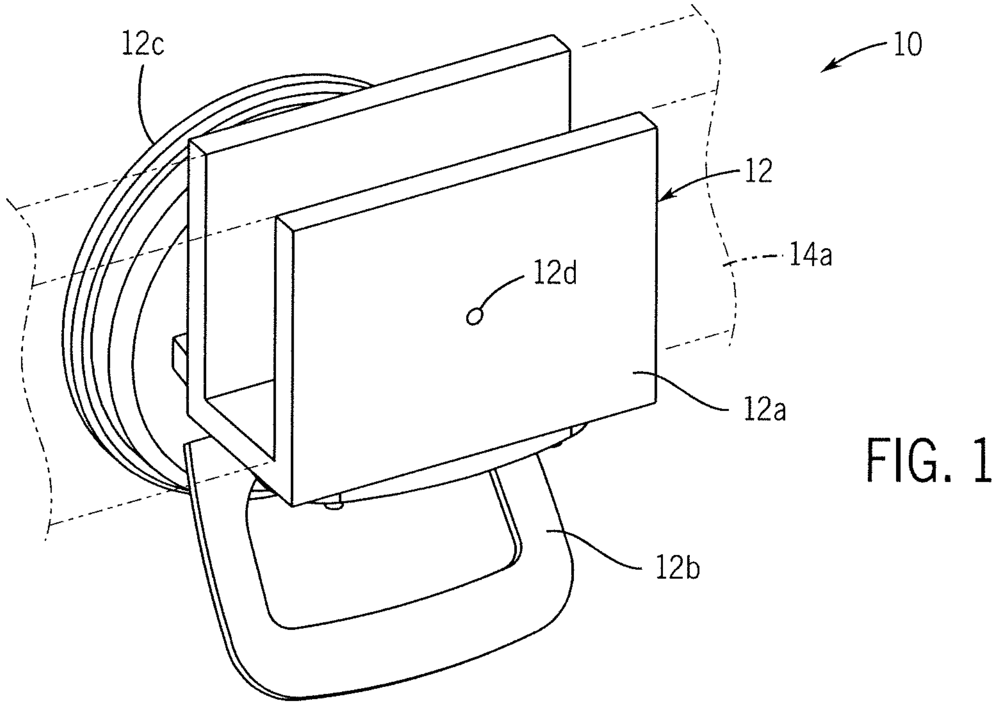
FIG. 1 is a perspective view of a mounting device for a board-up assembly, according to various embodiments.
Figure 2:
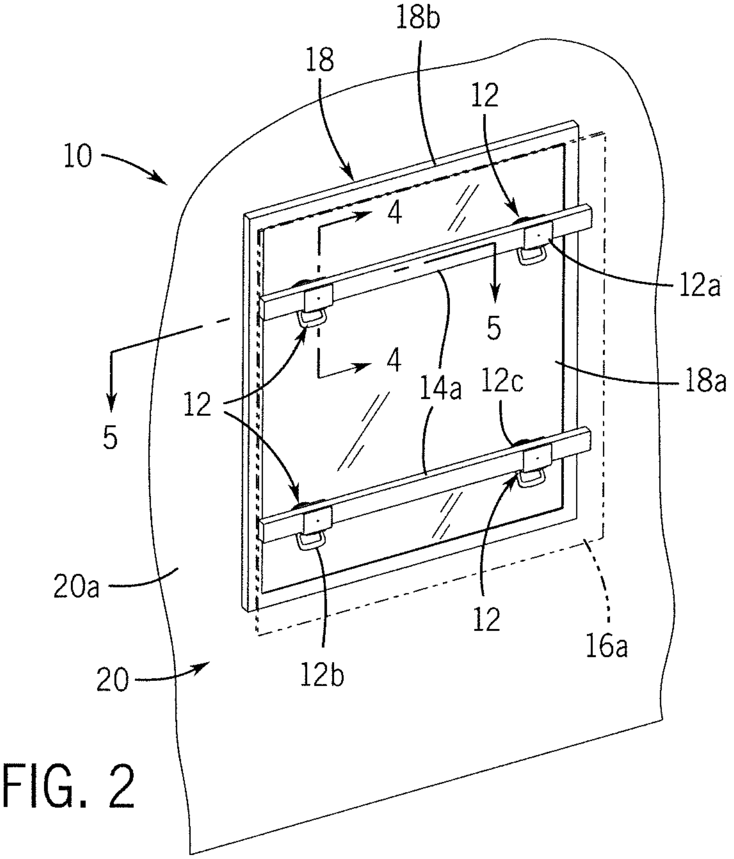
FIG. 2 is a perspective view of the board-up assembly of FIG. 1, shown in use with board-up assembly components.
Figure 3:
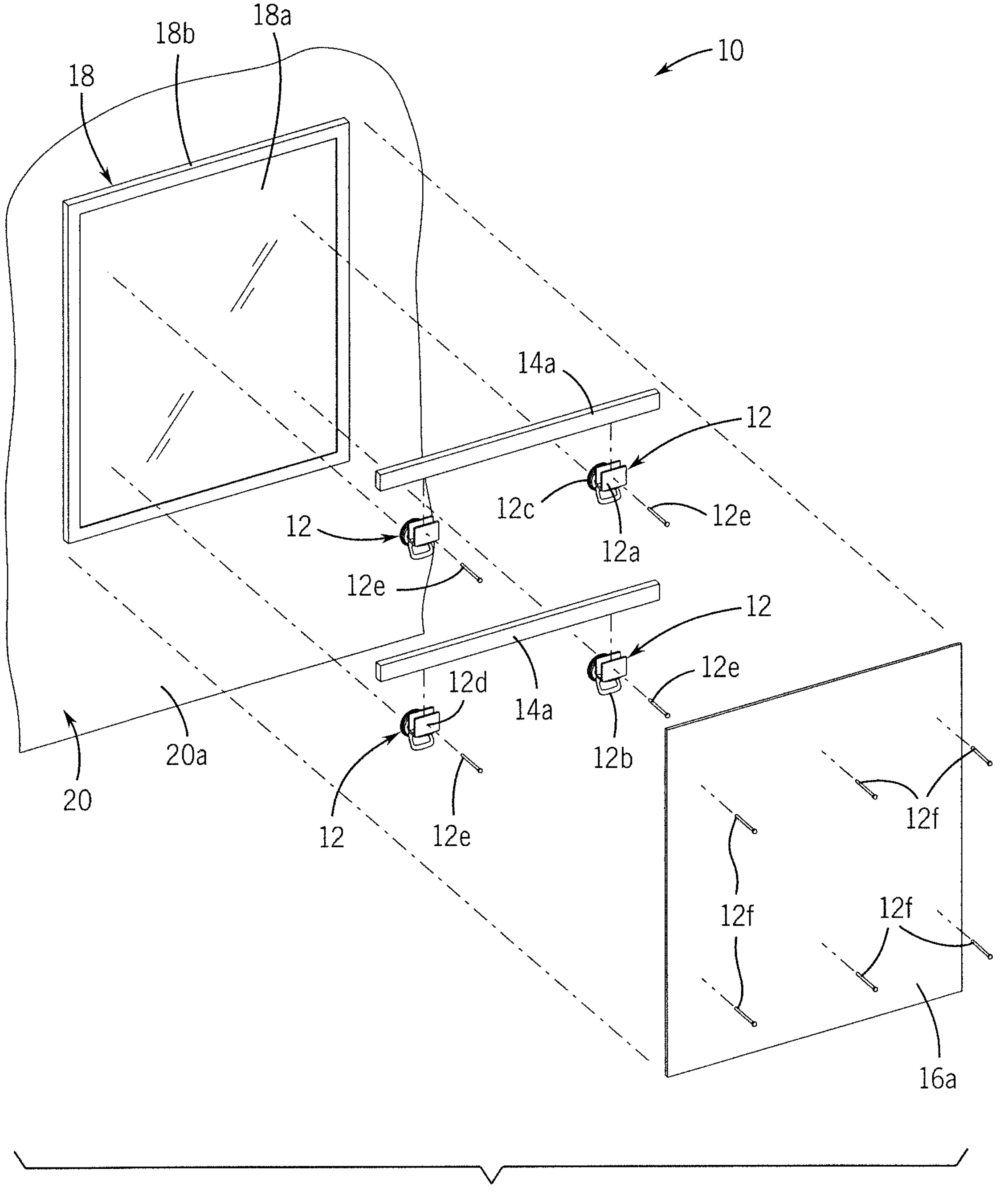
FIG. 3 is an exploded perspective view of the board up assembly.
Figure 4:
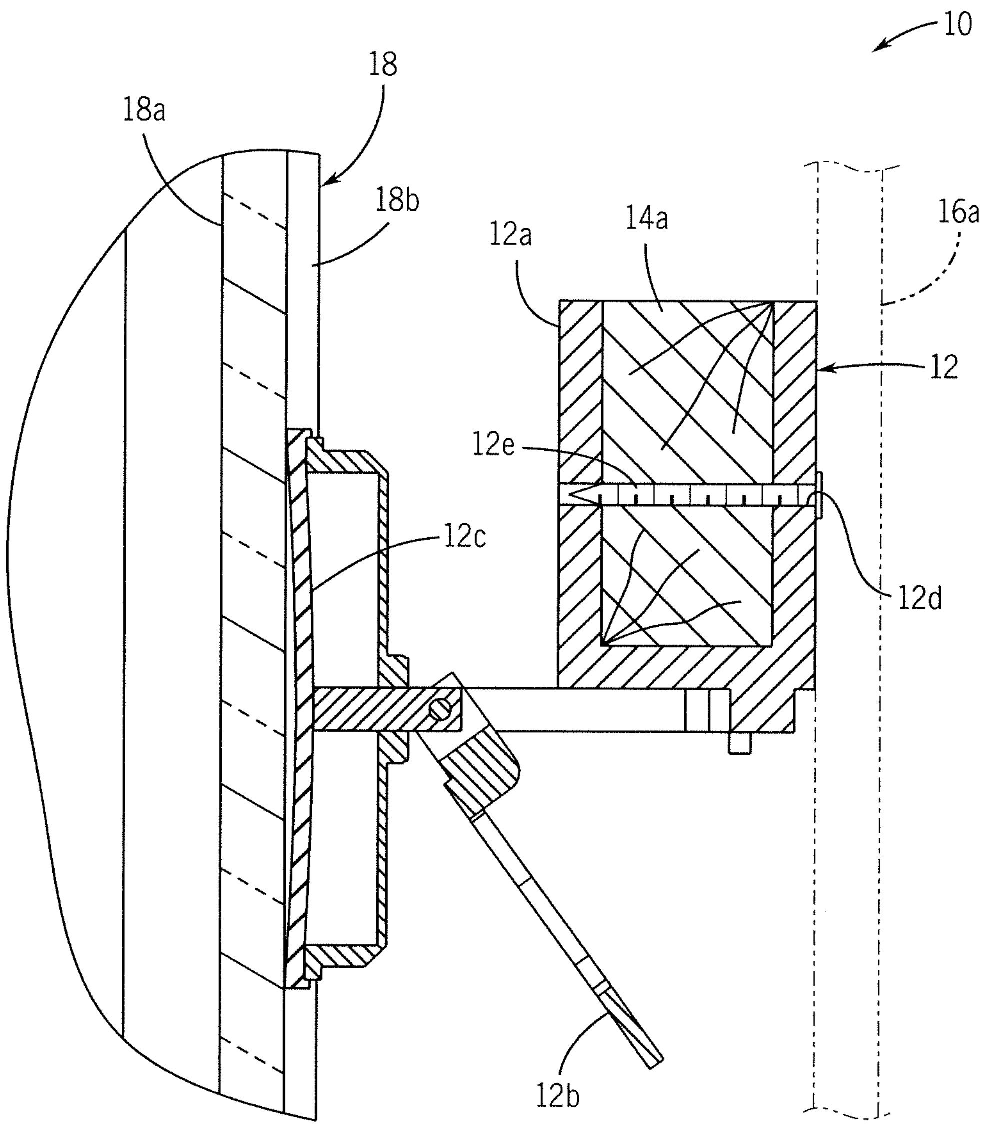
FIG. 4 is a cross sectional view taken on line 4-4 of FIG. 2.

With references to FIGS. 2-4, use of board-up assembly 10 for boarding up window 18 is depicted in accordance with certain embodiments. Building structure 20 may be a private home, apartment, office, store or other commercial building, and the like. Window 18 may be integral to a wall 20*a* of building structure 20, and may comprise widow glass 18*a*, and window frame 18*b*.

In embodiments, mounting device 12 may generally comprise a bracket 12*a* configured to retain framing member 14*a*, and a suction cup 12*c*. In further embodiments, mounting device 12 may comprise a suction cup actuator 12*b*. The mounting device is configured to attach to a smooth surface, such as glass 18*a* of window 18 via suction cup 12*c*. The mounting device 12 is further configured to hold components, such as framing member 14*a* and blocking member 16*a*, which may be used to board-up window 18. By using suction as an attachment mechanism, a user may avoid having to nail or drill holes into wall 20*a* of building structure 20.

Figure 5:
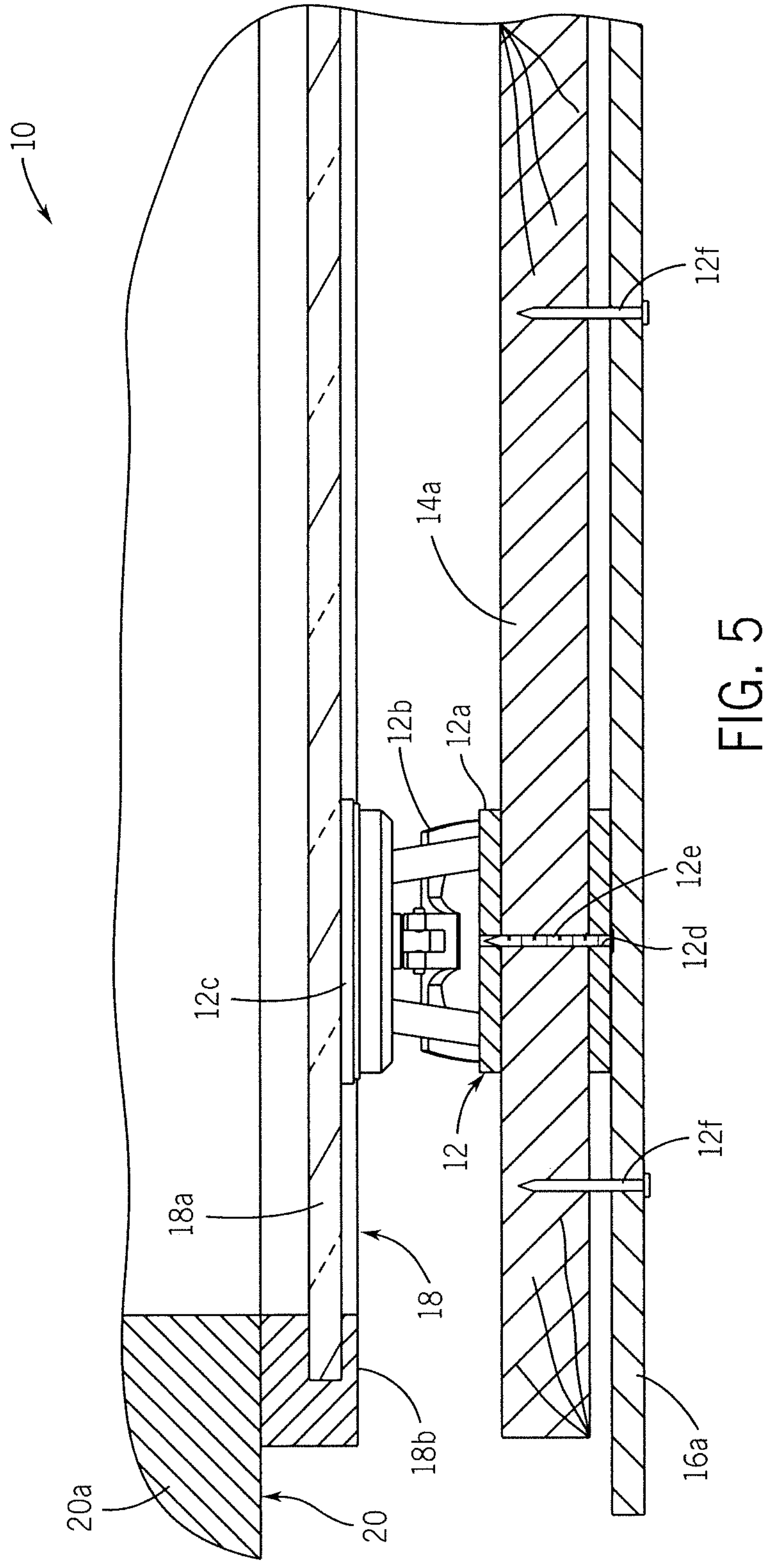
FIG. 5 is a cross sectional view taken on line 5-5 of FIG. 2.

In certain embodiments as depicted in FIGS. 1-5, framing member 14*a* may be a wooden beam having a rectangular cross section, and bracket 12*a* may be a U-shaped bracket providing a rectangular pocket, which is sized and shaped for holding said framing member. It shall be appreciated however, that bracket 12*a* and framing member 14*a* may have various sizes and geometric configurations in alternate embodiments. In some further embodiments, bracket 12*a* may include least one mounting hole 12*d*, for permitting framing member 14*a* to be secured within bracket 12*a* via at least one first fastener 12*e*. In one embodiment, as best depicted in FIGS. 4 and 5, bracket 12*a* may comprise a pair of corresponding mounting holes 12*d*, on opposite sides of the U-shaped bracket, such that first fastener 12*e* may insert through framing member 14*a* and opposite mounting holes 12*d*. As such, framing member 14*a* may be held securely within framing bracket 12*a*. In embodiments, mounting hole 12*d* may be a nail or screw hole and first fastener 12*e* may be a nail or screw. It shall be appreciated that any number of mounting holes and/or different types of fastening mechanisms or combinations thereof may be used in alternate embodiments.

In embodiments as best depicted in FIGS. 3-5, framing member 14*a* may be utilized to secure blocking member 16*a* over window 18, via at least one second fastener 12*f*. In embodiments, blocking member 16*a* may be a board and/or sheet material, such as wood, plywood, plastic, composite, and the like, which may generally block outside access to window 18. In embodiments, second fastener 12 may be a nail or screw which may be used to attach blocking member 16*a* to framing member 14*a*, as shown. In one embodiment as depicted in FIGS. 2 and 3, at least two framing members 14*a*, which may be wooden beams, may be attached to window glass 18*a* via at least four mounting devices 12 and at least four first fasteners 12*e*. Blocking member 16*a*, which may be a wooden or plywood board, may then be securely attached to the two framing members, via a multiple number of second fasteners 12*f*, e.g. nails, which may be hammered through blocking member 16*a* and framing members 14*a* (see also FIG. 5).

In embodiments, suction cup 12*c* of mounting device 12 is configured to adhere to a smooth or non-porous surface (e.g. window glass 18*a*) by suction pressure. In embodiments, suction cup 12*c* may comprise an elastic flexible material such as rubber, coupled to a main cup body, which may be made of a hard material such as steel or hard plastic. In some embodiments, suction cup actuator 12*b* may be configured to create suction pressure between the cup 12*c* and widow glass 18*a*. In one embodiment, suction cup actuator 12*b* may comprise a pivotable lever and/or clamp handle configured to pull back suction cup 12*c*, for creating suction pressure by increasing the volume of air space between cup 12*c* and window glass 18*a*. This forms an effective suction seal between the suction cup and window glass 18*a*, thus adhering the suction cup 12*c*/mounting device 12 to the glass. In some embodiments, actuator 12*b* may further be configured to clamp into a locked position when actuated. It shall be appreciate that various types of suction devices and mechanisms may be used in alternate embodiments.

Thus, mounting device 12 provides a stable holding/mounting mechanism for the framing member 14*a*. The mounting hole 12*d* allows for the installation of a fastener (e.g. nail, screw) to secure framing member 14*a* (e.g. wood framing) to bracket 12*a* and prevents unwanted movement and/or dislodgement of framing member 14*a* from bracket 12*a*. Once blocking member 16*a* is installed over mounting device 12, access is blocked to mounting device 12 (as well as window 18) preventing its easy removal by vandals, rioters and the like.

Figure 6:
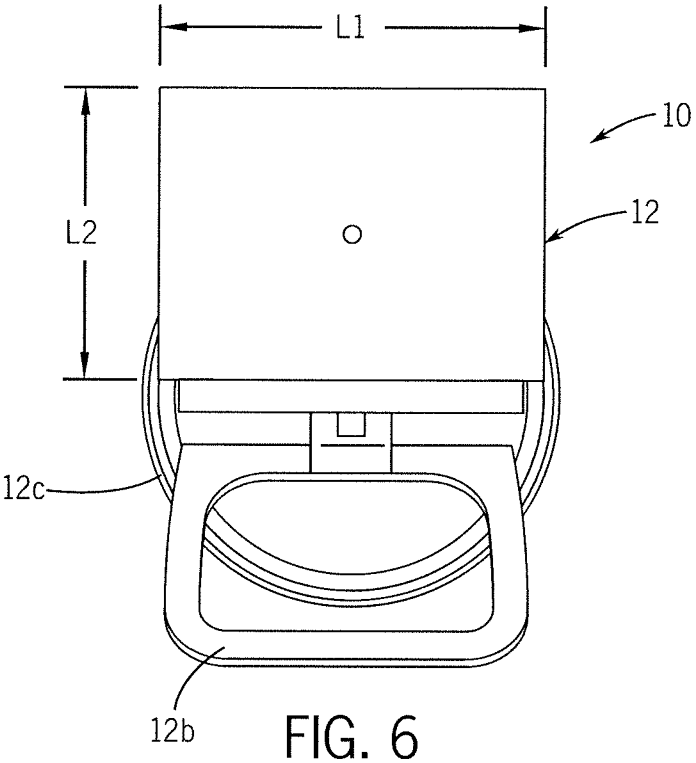
FIG. 6 is a front view of the mounting device of FIG. 1.
Figure 7:
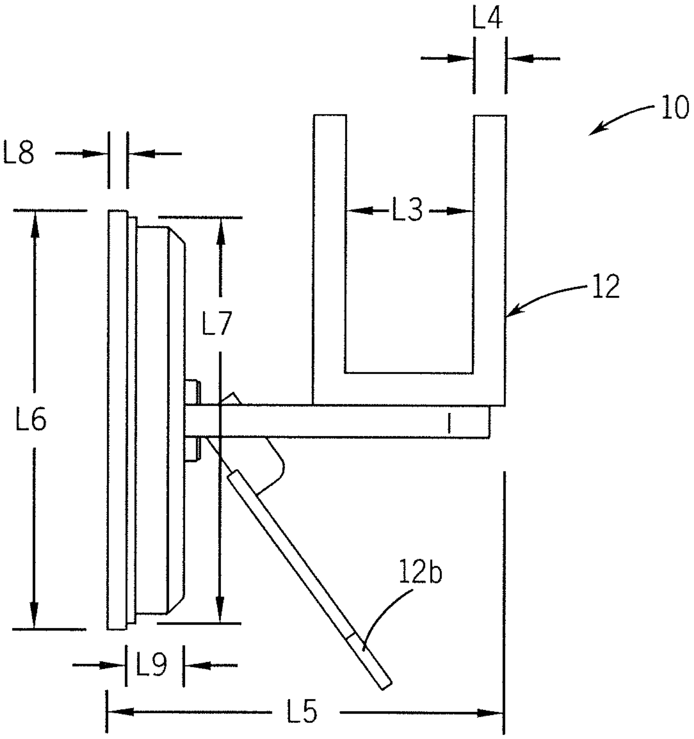
FIG. 7 is a side view of the mounting device of FIG. 1.

According to an exemplary embodiment, and with reference to FIGS. 6 and 7, bracket 12*a* of mounting device 12 may have a bracket length 'L1' of approximately 140 mm, a bracket height 'L2' of approximately 55 mm, an opening width "L3" of about 38.5 mm, and wall thickness 'L4' of about 8.25 mm. Additionally, the entire length 'L5' of device 12 may be approximately 117.5 mm. In certain embodiments, suction cup 12*c* may comprise a rubber component with a diameter 'L6' of about 118 mm, which may be coupled to a hard material main cup body having a diameter 'L7' of about 110 mm. Additionally, the thickness 'L8' of the rubber component of cup 12*c* may be about 7.5 mm, and the thickness 'L9' of the main cup body may be approximately 18 mm. In embodiments, bracket 12*a*, actuator 12*b*, and main cup body of suction cup 12*c* may be made of a metallic material, such as stainless steel. It shall appreciated that the dimensions of mounting device 12 may widely vary, and that various materials or combinations of materials may be used in alternate embodiments.

According to an exemplary embodiment, the device 10 may be used by cleaning off the glass (or other smooth/non-porous surface) and installing at least one or multiple mounting devices 12 at intervals based on the length and width of the area being boarded up. The mounting device(s) may be secured by pivotally rotating the lever/clamp handle of suction cup actuator to suction the cup to the surface. A wood framing member may then be installed into the bracket(s) of the mounting device(s) and secured with the first fastener (e.g. nail, screw, etc.) which is inserted through mounting hole(s) in the bracket(s). The blocking member, which may be a sheet of wood, plywood, plastic, composite, etc., may then be secured to the wood framing(s) via second fasteners (nail, screw, etc.), thus covering the area needing protection.

In some embodiments, at least one, and preferably two or more mounting devices may be used for supporting a framing bracket. Additionally, the number of mounting devices needed may depend on such factors as the size of the window, and size and/or weight of the framing bracket and/or blocking member. For example, for an 8 inch tall window, two mounting devices may be used around a top section of the window, and two around a bottom section to hold two framing members at a horizontal orientation. In some alternate embodiments, the mounting device(s) 12/framing bracket(s) 12*a* may be placed at different angles in order to facilitate other applications. In some embodiments, mounting device(s) 12/framing bracket(s) 12*a* may be rotated to various directions, which may facilitate installation. For example, mounting devices 12 may be rotated 90 degrees from the horizontal orientation to hold framing members 14*a* in a vertical position.

It shall be appreciated that components of board-up assembly 10 described herein can have multiple configurations in different embodiments. It shall be appreciated that the components of board-up assembly 10 described herein may comprise any alternative known materials in the field and be of any size and/or dimensions. It shall be appreciated that the components of board-up assembly 10 described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An assembly for boarding-up a building structure, comprising:

a first beam having a rectangular cross section, a first mounting device removably attached to a smooth surface of the building structure via suction pressure, the first mounting device comprising a first bracket configured to retain the first beam therein, the first mounting device further comprising a suction cup coupled to the first bracket, wherein the first mounting device is removably attached to the building structure without physically damaging or changing the building structure, and a blocking member, wherein the first mounting device to supports the blocking member attached to the first beam via at least one first fastener, the blocking member configured to board-up an area of said building structure for protecting against break-ins of the building structure, wherein the first beam is a wooden beam and wherein the first bracket is a U-shaped bracket defining a rectangular pocket configured to hold said first wooden beam therein, said first bracket including at least one mounting hole, wherein said first wooden beam is secured within said first bracket via said at least one first fastener being driven through said at least one mounting hole, said blocking member comprising a sheet material, said sheet material being attached to said first wooden beam via at least one second fastener, wherein said at least one first fastener and said at least one second fastener each comprise at least one of a nail or a screw.

2. The assembly of claim 1, wherein the smooth surface of said building structure is a window, and wherein the blocking member is configured to board-up said window.

3. The assembly of claim 1, the first mounting device further comprising a suction cup actuator, wherein the suction cup actuator comprises a lever, wherein the suction cup actuator is configured to create suction pressure in said suction cup via pivotal movement of said lever.

4. The assembly of claim 1, wherein the assembly further comprises a second mounting device, a third mounting device, and a fourth mounting device.

5. The assembly of claim 4, wherein each respective mounting device of the second mounting device, the third mounting device, and the fourth mounting device includes a suction cup, and wherein each of the first mounting device, the second mounting device, the third mounting device, and the fourth mounting device comprises a suction cup actuator, wherein the suction cup actuator comprises a lever, wherein the suction cup actuator of each respective mounting device is configured to create suction pressure in said suction cup of the respective mounting device via pivotal movement of said lever.

6. The assembly of claim 5, wherein the assembly further comprises at least 2 wooden beams said first wooden beam and a second wooden beam.

7. The assembly of claim 6, wherein each respective mounting device of the second mounting device, the third mounting device, and the fourth mounting device includes a respective bracket comprising at least one mounting hole for permitting a respective said wooden beam to be secured within said respective bracket via said at least one first fastener.

8. A method for boarding-up a building structure, comprising:

removably attaching a first mounting device to a smooth surface of the building structure via suction pressure, the first mounting device comprising a U-shaped bracket defining a rectangular pocket configured to retain a first wooden beam therein, the first mounting device further comprising a suction cup coupled to the bracket;

attaching the first wooden beam having a rectangular cross section to the first mounting device by inserting a portion of the first wooden beam in the rectangular pocket of the U-shaped bracket, driving a first fastener through a mounting hole located in the U-shaped bracket to secure the first wooden beam within the rectangular pocket of the U-shaped bracket, and attaching a blocking member to the first wooden beam retained within the U-shaped bracket of the first mounting device via a second fastener, the blocking member configured to board-up an area of said building structure for protecting against break-ins of the building structure, wherein said blocking member comprises a sheet material, wherein said first fastener and said second fastener each comprise at least one of a nail or a screw, wherein the first mounting device is removably attached to the building structure without physically damaging or changing the building structure.

9. The method of claim 8, wherein the smooth surface of said building structure is a window, and wherein the blocking member is configured to board-up said window.

10. The method of claim 8, wherein the first mounting device further comprises a suction cup actuator, wherein the suction cup actuator comprises a lever, wherein the suction cup actuator is configured to create suction pressure in said suction cup via pivotal movement of said lever.

11. The method of claim 8, the method comprising:

attaching a second mounting device linearly aligned with the first mounting devices to said smooth surface of the building structure via suction pressure; and attaching a third mounting device and a fourth mounting device which are linearly aligned with each other to said smooth surface of the building structure;

attaching the first wooden beam to the second mounting device so that the first wooden beam is supported by both the first mounting device and the second mounting device; and attaching a second wooden beam to the third mounting device and the fourth mounting device; and attaching the blocking member to the second wooden beam so that the blocking member is attached to both the first wooden beam and the second wooden beam.

* * * * *